(12) United States Patent
Duan et al.

(10) Patent No.: US 10,307,746 B2
(45) Date of Patent: Jun. 4, 2019

(54) PALLADIUM HYDRIDE NANOMATERIALS

(71) Applicant: THE REGENTS OF THE UNIVERSITY OF CALIFORNIA, Oakland, CA (US)

(72) Inventors: Xiangfeng Duan, Los Angeles, CA (US); Yu Huang, Los Angeles, CA (US); Zipeng Zhao, Los Angeles, CA (US); Xiaoqing Huang, Los Angeles, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 61 days.

(21) Appl. No.: 15/505,454

(22) PCT Filed: Aug. 21, 2015

(86) PCT No.: PCT/US2015/046297
§ 371 (c)(1),
(2) Date: Feb. 21, 2017

(87) PCT Pub. No.: WO2016/029114
PCT Pub. Date: Feb. 25, 2016

(65) Prior Publication Data
US 2017/0274363 A1    Sep. 28, 2017

Related U.S. Application Data

(60) Provisional application No. 62/040,784, filed on Aug. 22, 2014.

(51) Int. Cl.
*B82Y 30/00*        (2011.01)
*B01J 31/12*        (2006.01)
(Continued)

(52) U.S. Cl.
CPC ......... *B01J 31/121* (2013.01); *B01J 35/0013* (2013.01); *B01J 37/009* (2013.01);
(Continued)

(58) Field of Classification Search
CPC .. B01J 31/121; B01J 35/0013; B01J 37/0072; B01J 37/009; B01J 37/04; B01J 37/06;
(Continued)

(56) References Cited

U.S. PATENT DOCUMENTS 3,098,706 A * 7/1963 Blitzer ................. C01B 6/24
                                                      423/644
3,547,964 A * 12/1970 Olivier ................ B01J 31/185
                                                      423/22

(Continued)

OTHER PUBLICATIONS

N. A. A. Rusman et al., "A review on the current progress of metal hydrides material for solid-state hydrogen storage applications." International Journal of Hydrogen Energy 41, pp. 12108-12126. (Year: 2016).*

(Continued)

*Primary Examiner* — Patricia L. Hailey
(74) *Attorney, Agent, or Firm* — Foley & Lardner LLP; Cliff Z. Liu

(57) ABSTRACT

A palladium hydride nanomaterial includes nanostructures having a chemical composition represented by the formula: $M_y\text{-}Pd_xH_z$, where M is at least one metal different from palladium; x has a non-zero value in the range of 0 to 5; y has a value in the range of 0 to 5; and z has a non-zero value in the range of 0 to 5.

20 Claims, 7 Drawing Sheets

(51) Int. Cl.
- *C01B 6/02* (2006.01)
- *B01J 35/00* (2006.01)
- *B01J 37/00* (2006.01)
- *B01J 37/04* (2006.01)
- *B01J 37/06* (2006.01)
- *C01B 3/00* (2006.01)
- *C01B 6/24* (2006.01)

(52) U.S. Cl.
CPC ............ *B01J 37/0072* (2013.01); *B01J 37/04* (2013.01); *B01J 37/06* (2013.01); *B82Y 30/00* (2013.01); *C01B 3/0026* (2013.01); *C01B 3/0031* (2013.01); *C01B 6/02* (2013.01); *C01B 6/24* (2013.01)

(58) Field of Classification Search
CPC ....... C01B 3/0026; C01B 3/0031; C01B 6/02; C01B 6/24
USPC ........ 502/339, 324, 313, 315, 114; 423/644; 420/900, 901, 463, 465
See application file for complete search history.

(56) References Cited

U.S. PATENT DOCUMENTS

| | | | | |
|---|---|---|---|---|
| 4,267,383 | A | * | 5/1981 | Booth ................. C07C 45/50 568/454 |
| 4,485,152 | A | * | 11/1984 | Homan ................. H01L 39/12 257/E39.006 |
| 5,296,438 | A | * | 3/1994 | Heung ................. B22F 9/023 206/0.7 |
| 7,507,495 | B2 | | 3/2009 | Wang et al. |

OTHER PUBLICATIONS

M. D. Dolan et al., "Suppression of the critical temperature in binary vanadium hydrides." Journal of Alloys and Compounds 586, pp. 385-391. (Year: 2014).*

H. Kohlmann et al., "The anti-perovskite type hydride InPd3H0.89". Journal of Solid State Chemistry 183, pp. 2461-2465. (Year: 2010).*

Satoshi Akamaru et al., "Alloying effects on the hydrogen-storage capability of Pd—Tm—H (TM=Cu, Au, Pt, Ir) systems." Journal of Alloys and Compounds 614, pp. 238-243. (Year: 2014).*

N. G. Semaltianos et al., "Palladium or palladium hydride nanoparticles synthesized by laser ablation of a bulk palladium target in liquids." Journal of Colloid and Interface Science 402, pp. 307-311. (Year: 2013).*

International Search Report and Written Opinion for International Patent Application No. PCT/US2015/046297, dated Nov. 23, 2015, 12 pages.

Kobayashi, Hirokazu et al., "Hydrogen Absorption in the Core/Shell Interface of Pd/Pt Nanoparticles", J. Am. Chem. Soc. 2008, 130, 1818-1819.

Krystian, M. et al., "Formation of superabundant vacancies in nano-Pd—H generated by high-pressure torsion", Scripta Materialia 62 (2010) 49-52.

Lu, Yizhong et al., "Nano-PtPd Cubes on Graphene Exhibit Enhanced Activity and Durability in Methanol Electrooxidation after CO Stripping-Cleaning", J. Phys. Chem. C 2013, 117, 2926-2938.

Bennett, .P.A. et al. (1982) "Electronic structure and surface kinetics of palladium hydride studied with x-ray photoelectron spectroscopy and electron-energy-loss spectroscopy," Phys. Rev. B 26(11):6030-6039.

McKeehan, L.W. (1922) "The Crystal Structures of the System Palladium-Hydrogen," Phys. Rev. 21:334-342.

Riesterer, Z. (1987) "Electronic Structure and Bonding in Metal Hydrides, Studied with Photoelectron Spectroscopy," Phys. B-Condensed Matter 66:441-458.

Sakamoto, Y. et al. (1982) "X-ray investigation of the absorption of hydrogen by several palladium and nickel solid solution alloys," Journal of the Less Common Metals 88(1):115-124.

Wang, D. et al. (2011) "Effective Octadecylamine System for Nanocrystal Synthesis," Inorg. Chem. 50(11):5196-5202.

Worsham, Jr., J.E. et al. (1957) "Neutron-Diffraction Observations on the Palladium-Hydrogen and Palladium-Deuterium Systems," J. Phys. Chem. Solids 3:303-310.

Wu, Y. et al. (2011) "Monodispersed Pd—Ni Nanoparticles: Composition Control Synthesis and Catalytic Properties in the Miyaura-Suzuki Reaction," Inorg. Chem. 50(6):2046-2048.

* cited by examiner

PALLADIUM HYDRIDE NANOMATERIALS

CROSS-REFERENCE TO RELATED APPLICATION

This application is a National Stage Entry of International Application No. PCT/US2015/046297, filed Aug. 21, 2015, which claims the benefit of U.S. Provisional Application No. 62/040,784, filed on Aug. 22, 2014, the content of which is incorporated herein by reference in its entirety.

STATEMENT REGARDING FEDERALLY SPONSORED RESEARCH OR DEVELOPMENT

This invention was made with Government support under Grant Number W911NF-09-1-0433, awarded by the U.S. Army, Army Research Office. The Government has certain rights in the invention.

TECHNICAL FIELD

This disclosure relates to palladium hydride nanomaterials and methods to form such nanomaterials.

BACKGROUND

It is desirable to explore catalytic applications of palladium hydride and palladium alloy hydrides. However, such exploration has been hampered by the difficulty of access to stable palladium and palladium alloy hydrides.

It is against this background that a need arose to develop embodiments of this disclosure.

SUMMARY

One aspect of this disclosure relates to a palladium hydride nanomaterial. In some embodiments, the palladium hydride nanomaterial includes nanostructures having a chemical composition represented by the formula: $M_y\text{-}Pd_xH_z$, where M is at least one metal different from palladium; x has a non-zero value in the range of 0 to about 5; y has a value in the range of 0 to about 5; and z has a non-zero value in the range of 0 to about 5.

In some embodiments, y has a non-zero value, M is at least one transition metal different from palladium, and the nanostructures include an intermetallic alloy of M and palladium.

In some embodiments, M is selected from nickel, cobalt, chromium, manganese, vanadium, and platinum.

In some embodiments, x is in the range of about 0.2 to about 1, about 0.4 to about 1, about 0.6 to about 1, or about 0.8 to about 1.

In some embodiments, y is in the range of 0 to about 0.8, 0 to about 0.6, 0 to about 0.4, 0 to about 0.2, about 0.01 to about 0.2, or about 0.05 to about 0.2.

In some embodiments, z is in the range of about 0.1 to about 0.9, about 0.2 to about 0.8, about 0.3 to about 0.7, or about 0.4 to about 0.6.

In some embodiments, a sum of x and y is equal to about 1, and a ratio of z to the sum of x and y is less than or equal to about 1.

In some embodiments, the nanostructures have sizes in the range of about 1 nm to about 500 nm, about 1 nm to about 400 nm, about 1 nm to about 300 nm, about 1 nm to about 200 nm, about 1 nm to about 100 nm, about 1 nm to about 80 nm, or about 1 nm to about 60 nm.

In some embodiments, the nanostructures are crystalline.

In some embodiments, the palladium hydride nanomaterial has a specific surface area of at least about 1 $m^2/g$, at least about 5 $m^2/g$, at least about 10 $m^2/g$, at least about 15 $m^2/g$, or at least about 20 $m^2/g$.

Another aspect of this disclosure relates to a solution phase synthesis method to form a palladium alloy hydride nanomaterial. In some embodiments, the method includes reacting a palladium-containing precursor and at least one other metal-containing precursor in a liquid medium to form nanostructures of a palladium alloy hydride, where the metal-containing precursor includes a metal different from palladium.

In some embodiments, the metal is a transition metal different from palladium.

In some embodiments, the metal is selected from nickel, cobalt, chromium, manganese, vanadium, and platinum.

In some embodiments, the palladium-containing precursor is a coordination complex of palladium with an organic anion.

In some embodiments, the metal-containing precursor is a coordination complex of the metal with an organic anion.

In some embodiments, a weight ratio of the metal-containing precursor and the palladium-containing precursor is in the range of about 0.1 to about 10, about 0.5 to about 5, about 0.5 to about 4, about 0.5 to about 3, about 0.5 to about 2, about 0.8 to about 2, about 1 to about 2, or about 1 to about 1.5.

In some embodiments, the liquid medium includes at least one organic solvent.

In some embodiments, reacting is under conditions of a temperature in the range of about 50° C. to about 250° C., about 100° C. to about 200° C., about 120° C. to about 200° C., or about 140° C. to about 180° C., and a time duration in the range of about 0.5 h to about 15 h, about 1 h to about 10 h, about 1 h to about 8 h, or about 2 h to about 6 h.

In some embodiments, reacting is in the presence of an amine.

In some embodiments, the nanostructures have sizes in the range of about 1 nm to about 500 nm, about 1 nm to about 400 nm, about 1 nm to about 300 nm, about 1 nm to about 200 nm, about 1 nm to about 100 nm, about 1 nm to about 80 nm, or about 1 nm to about 60 nm.

Other aspects and embodiments of this disclosure are also contemplated. The foregoing summary and the following detailed description are not meant to restrict this disclosure to any particular embodiment but are merely meant to describe some embodiments of this disclosure.

BRIEF DESCRIPTION OF THE DRAWINGS

For a better understanding of the nature and objects of some embodiments of this disclosure, reference should be made to the following detailed description taken in conjunction with the accompanying drawings.

DETAILED DESCRIPTION

Figure 1A:
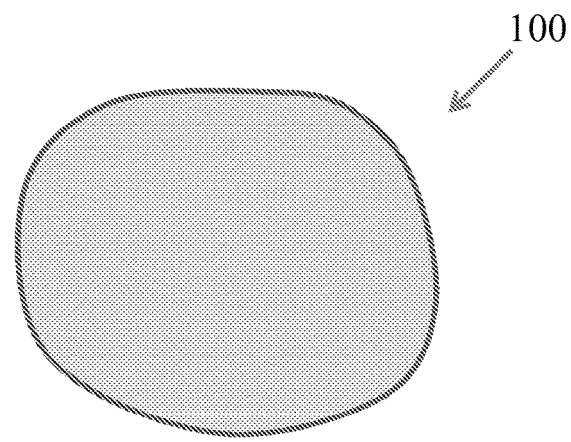
FIG. 1A. A schematic of a palladium hydride nanomaterial in the form of a nanoparticle according to an embodiment of this disclosure.

Embodiments of this disclosure are directed to a class of palladium-based hydride nanomaterials, including nanomaterials of palladium hydride and palladium alloy hydrides, which can be synthesized through solution phase synthesis. The palladium hydride nanomaterials encompass a wide metallic composition range, including palladium nickel alloy (PdNi), palladium cobalt alloy (PdCo), palladium chromium alloy (PdCr), palladium manganese alloy (PdMn), palladium vanadium alloy (PdV), and palladium platinum alloy (PdPt). Palladium hydride nanomaterials also encompass combinations of palladium with other metals in a manner other than, or in conjunction with, alloying, such as via doping or in the form of heterostructures. Advantageously, palladium hydride nanomaterials can be synthesized in the nanoscale via a solution phase synthetic method, which can be carried out under moderate conditions, can attain high yields, and can omit the use of strong reducing agents, and, in some embodiments, also can omit the use of surfactants. Resulting palladium hydride nanomaterials can be stable over extended time periods, and without requiring a hydrogen-rich atmosphere or maintaining an external hydrogen pressure for such prolonged stability.

In some embodiments, a palladium hydride nanomaterial is an intermetallic, ternary alloy system having a chemical composition that can be generally represented by the formula $M_y$-$Pd_xH_z$ and, more specifically, by the formula $Pd_xM_yH_z$, where (1) Pd represents palladium; (2) H represents hydrogen; (3) M represents at least one metal different from palladium, such as a transition metal selected from Group 3, Group 4, Group 5, Group 6, Group 7, Group 8, Group 9, Group 10, Group 11, and Group 12 of the Periodic Table; (4) x has a non-zero value in the range of 0 to about 5, such as from about 0 to about 4, from about 0 to about 3, from about 0 to about 2, from about 0 to about 1.5, from about 0 to about 1, from about 0.2 to about 1, from about 0.4 to about 1, from about 0.6 to about 1, or from about 0.8 to about 1; (5) y has a non-zero value in the range of 0 to about 5, such as from about 0 to about 4, from about 0 to about 3, from about 0 to about 2, from about 0 to about 1.5, from about 0 to about 1, from about 0 to about 0.8, from about 0 to about 0.6, from about 0 to about 0.4, from about 0 to about 0.2, from about 0.01 to about 0.2, or from about 0.05 to about 0.2; and (6) z has a non-zero value in the range of 0 to about 5, such as from about 0 to about 4, from about 0 to about 3, from about 0 to about 2, from about 0 to about 1.5, from about 0 to about 1, from about 0.1 to about 0.9, from about 0.2 to about 0.8, from about 0.3 to about 0.7, or from about 0.4 to about 0.6. In some embodiments, M is selected from nickel (or Ni), cobalt (or Co), chromium (or Cr), manganese (or Mn), vanadium (or V), and platinum (or Pt). In some embodiments, a ratio of y to x is less than or equal to 1, namely $y:x \leq 1$ or $<1$, such as $\leq 0.9$, $\leq 0.8$, $\leq 0.7$, $\leq 0.6$, $\leq 0.5$, $\leq 0.4$, $\leq 0.3$, $\leq 0.2$, $0.01 \leq y:x \leq 0.9$, $0.01 \leq y:x \leq 0.8$, $0.01 \leq y:x \leq 0.7$, $0.01 \leq y:x \leq 0.6$, $0.01 \leq y:x \leq 0.5$, $0.01 \leq y:x \leq 0.4$, $0.01 \leq y:x \leq 0.3$, or $0.01 \leq y:x \leq 0.2$, although ratios of y to x greater than 1 are also encompassed by this disclosure. In some embodiments, a ratio of z to x is less than or equal to 1, namely $z:x \leq 1$ or $\leq 1$, such as $\leq 0.9$, $\leq 0.8$, $\leq 0.7$, $\leq 0.6$, $\leq 0.5$, $0.05 \leq z:x \leq 0.9$, $0.05 \leq z:x \leq 0.8$, $0.05 \leq z:x \leq 0.7$, $0.05 \leq z:x \leq 0.6$, or $0.05 \leq z:x \leq 0.5$, although ratios of z to x greater than 1 are also encompassed by this disclosure. In some embodiments, a sum of x and y is equal to 1, namely $x+y=1$ (or $y=1-x$), $y \leq x$ or $y<x$, and a ratio of z to the sum of x and y is less than or equal to 1, namely $z \leq 1$ or $<1$, such as $\leq 0.9$, $\leq 0.8$, $\leq 0.7$, $\leq 0.6$, $\leq 0.5$, $0.05 \leq z \leq 0.9$, $0.05 \leq z \leq 0.8$, $0.05 \leq z \leq 0.7$, $0.05 \leq z \leq 0.6$, or $0.05 \leq z \leq 0.5$, although ratios of z to (x+y) greater than 1 are also encompassed by this disclosure.

Other embodiments are encompassed by this disclosure, including quaternary, quinary, and higher order alloy systems, such as generally represented by the formula $M'_{y'}M''_{y''}$—$Pd_xH_z$ or more specifically as $Pd_xM'_{y'u}M''_{y''}H_z$, where M' and M'' are different metals (which are each different from palladium) that can be selected from the above-noted transition metals, and y' and y'' can be the same or different, and a sum of y' and y'' can be selected from the above-noted ranges specified for y. Non-hydride forms, such as where z is zero, are also contemplated. Binary systems are also contemplated, such as where y (or a sum of y' and y'') is zero. Also contemplated are combinations of palladium hydride with other metals in a manner other than, or in conjunction with, alloying, as more generally represented by the formula $M_y$-$Pd_xH_z$ or $M'_{y'}M''_{y''}$—$Pd_xH_z$. For example, M (or M' and M'') can be included at doping levels and can be doped into palladium hydride. As another example, a heterostructure of palladium hydride with one or more other metals can be formed, where the heterostructure can include a first phase and a second phase, where the phases are joined together or next to one another, and the first phase and the second phase have different chemical compositions. The first phase can include or can be at least predominantly, for example, palladium hydride, and the second material can include or can be at least predominantly, for example, one or more other metals different from palladium.

In some embodiments, a palladium hydride nanomaterial includes multiple nanostructures having the above-noted chemical composition, where (1) the nanostructures have sizes (or have an average size) in the range of about 1 nm to about 500 nm, such as from about 1 nm to about 400 nm, from about 1 nm to about 300 nm, from about 1 nm to about 200 nm, from about 1 nm to about 100 nm, from about 1 nm to about 80 nm, or from about 1 nm to about 60 nm; (2) the nanostructures have aspect ratios (or have an average aspect ratio) in the range of up to about 3, such as from about 1 to about 3, from about 1 to about 2.5, from about 1 to about 2, or from about 1 to about 1.5, or in the range of greater than about 3, such as about 4 or greater, about 5 or greater, or about 10 or greater; and (3) the nanostructures are largely or substantially crystalline, such as with a percentage of crystallinity (by volume or weight) of at least about 50%, at least about 60%, at least about 70%, at least about 80%, at least about 90%, at least about 95%, at least about 98%, or at least about 99% or more. A palladium hydride nanomaterial including nanostructures can have a high specific surface area to promote catalytic activity, such as a Brunauer-Emmett-Teller (BET) specific surface area of at least about 1 $m^2/g$, at least about 5 $m^2/g$, at least about 10 $m^2/g$, at least about 15 $m^2/g$, or at least about 20 $m^2/g$, and up to about 40 $m^2/g$ or more, up to about 60 $m^2/g$ or more, up to about 80 $m^2/g$ or more, or up to about 100 $m^2/g$ or more.

Figure 1B:
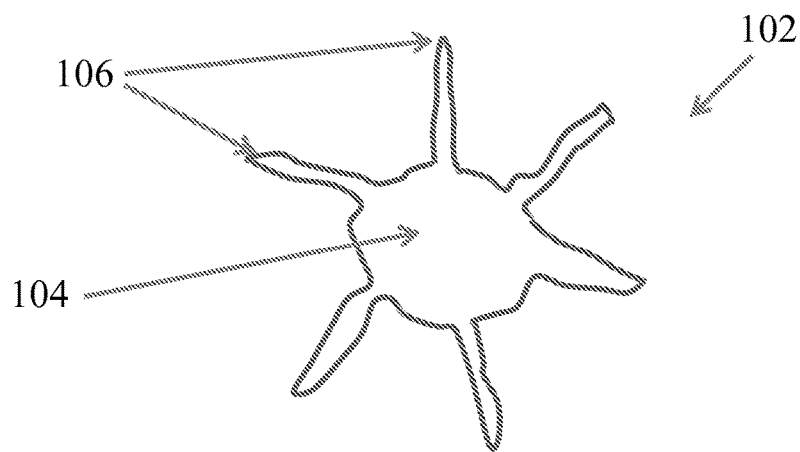
FIG. 1B. A schematic of a palladium hydride nanomaterial in the form of a nanobranch structure according to an embodiment of this disclosure.

Palladium hydride nanomaterials can have a variety of morphologies. For example, FIG. 1A is a schematic of a palladium hydride nanomaterial in the form of a nanoparticle 100 according to an embodiment of this disclosure. The nanoparticle 100 has a spherical or spheroidal shape, and an aspect ratio in the range of up to about 3, such as from about 1 to about 3, from about 1 to about 2.5, from about 1 to about 2, or from about 1 to about 1.5. As another example, FIG. 1B is a schematic of a palladium hydride nanomaterial in the form of a nanobranch structure 102 according to an embodiment of this disclosure. The nanobranch structure 102 includes a core 104 having a spherical or spheroidal shape, and a set of elongated branches 106 extending from the core 104. Other morphologies are encompassed by this disclosure, including nanorods, nanowires, or other elongated nanostructures having aspect ratios greater than about 3; core-shell structures; core-multi-shell structures; and nanoparticle-decorated cores, amongst others.

Advantageously, embodiments of a palladium hydride nanomaterial can be synthesized in solution phase and can remain stable for extended time periods, without requiring external presence or application of hydrogen to remain in its hydride form. In some embodiments, a solution phase synthesis can be carried out by mixing or otherwise combining a palladium-containing precursor and another metal-containing precursor in a liquid medium, where (1) the metal-containing precursor includes a metal different from palladium, such as selected from Ni, Co, Cr, Mn, V, and Pt, (2) the palladium-containing precursor can be an organometallic coordination complex of palladium with an organic anion, such as acetylacetonate, or can be another suitable palladium-containing precursor; (3) the metal-containing precursor can be an organometallic coordination complex of the metal with an organic anion, such as acetylacetonate, or can be another suitable metal-containing precursor; (4) a weight ratio of the metal-containing precursor and the palladium-containing precursor can be in the range of about 0.1 to about 10, such as from about 0.5 to about 5, from about 0.5 to about 4, from about 0.5 to about 3, from about 0.5 to about 2, from about 0.8 to about 2, from about 1 to about 2, or from about 1 to about 1.5; and (5) the liquid medium includes one or more solvents, such as one or more organic solvents selected from polar aprotic solvents, polar protic solvents, and non-polar solvents. Multiple metal-containing precursors including metals different from palladium can be used, such as to form alloys or intermetallics including three or more different metals. A resulting reaction mixture can be reacted under conditions of a temperature in the range of about 50° C. to about 250° C., such as from about 100° C. to about 200° C., from about 120° C. to about 200° C., or from about 140° C. to about 180° C., and a time duration in the range of about 0.5 h to about 15 h, such as from about 1 h to about 10 h, from about 1 h to about 8 h, or from about 2 h to about 6 h. After reaction, a resulting palladium hydride nanomaterial can be recovered by centrifugation or another suitable separation method. Advantageously, the solution phase synthesis can be carried out under moderate conditions, and can omit the use of surfactants and also can omit the separate addition of a reducing agent (since reduction and hydride formation can be attained through the precursors without a separate reducing agent).

In some embodiments, a solution phase synthesis can be carried out by including one or more short chain amines, such as n-butylamine, n-octylamine, or another suitable amine, diamine, or polyamine including 1-15, 1-10, 2-15, 2-10, 1-5, or 2-5 carbon atoms per molecule, as reagents to control a morphology and a size of a palladium hydride nanomaterial. For example, the use of n-butylamine or n-octylamine can lead to the formation of palladium hydride nanobranch structures.

Example applications of palladium hydride nanomaterials include: (1) catalysts for reactions such as refining, exhaust gas treatment, or for chemical synthesis and petrochemical applications; (2) use as chemical sensors, such as hydrogen sensors; and (3) use for hydrogen storage. For example, intermetallic alloy hydrides can have superior catalytic properties and can utilize less precious metal content than non-hydrides and single metallic hydrides. The formation of palladium alloy hydride can cause significant valence band structure change. When implemented as a catalyst, the valence band structure is an important factor that can affect molecules or function groups adsorption energy and activation energy when interacting with the catalyst, thereby improving catalytic activity in terms of activity and selectivity. With such significant valence band structure change, some embodiments are directed to the catalytic application of palladium alloy hydride nanomaterials. For example, improvement of selectivity can be observed from palladium alone to palladium hydride, and further improvement can be observed with palladium nickel hydride, for the reaction of selective oxidation of primary alcohol to aldehyde.

EXAMPLE

The following example describes specific aspects of some embodiments of this disclosure to illustrate and provide a description for those of ordinary skill in the art. The example should not be construed as limiting this disclosure, as the example merely provides specific methodology useful in understanding and practicing some embodiments of this disclosure.

Methods and Results:

Chemicals and Materials.

Palladium (II) acetylacetonate [Pd(acac)$_2$](99%), Platinum (II) acetylacetonate [Pt(acac)$_2$](99%), Nickel (II) acetylacetonate [Ni(acac)$_2$](95%), Copper(II) acetylacetonate [Cu(acac)$_2$](98%), Vanadium(III) acetylacetonate [V(acac)$_3$](97%), Iron(III) acetylacetonate [Fe(acac)$_3$] (97%), Chromium(III) acetylacetonate [Cr(acac)$_3$](97%), and Cobalt (II) acetylacetonate [Co(acac)$_2$](97%) were purchased from Alfa Aesar. N,N-Dimethylformamide (DMF) and ethylene glycol (EG) were purchased from Fisher Scientific. n-octylamine, n-butylamine, 1,1-dimethylhydrazine, ethylenediamine, triethylamine, hydroxylethylamine, ascorbic acid, citric acid, formaldehyde (37% solution), and benzaldehyde were purchased from Sigma Aldrich.

Synthesis of Palladium Hydride Nanoparticle.

About 8 mg of Pd(acac)$_2$ dispersed in about 10 ml of DMF, and then heated at about 160° C. for about 4 h.

Synthesis of Palladium Hydride Nanobranch Structure.

About 8 mg of Pd(acac)$_2$ dispersed in about 10 ml of DMF, adding about 100 μL of n-octylamine, and then heated at about 160° C. for about 4 h.

Synthesis of Palladium Alloy Hydride ($M_x$-$Pd_xH_z$)

A typical solution phase synthetic method includes mixing a palladium acetylacetonate precursor, Pd(acac)$_2$, with another metal acetylacetonate precursor, M(acac)$_2$ or M(acac)$_3$, in about 10 ml of DMF in an about 25 ml vial, with the ratio and amounts of metal precursors as showed in Table 1. The vial with the resulting precursor solution is placed into an about 160° C. oil bath and kept at about 160° C. for about 4 h, and then after reaction, the solution is centrifuged and washed with ethanol. The as-synthesized nanomaterial can be kept in a sealed vial for long-term preservation. Exposure to high temperature should be avoided or reduced to preserve the nanomaterial.

TABLE 1

Precursor ratio of $M_y$—$Pd_xH_z$ (M= Ni, Co, Cr, Mn, V, or Pt)

| | Pd(acac)$_2$/ mg | M(acac)$_n$/ mg | DMF/ ml | Temperature & Time |
|---|---|---|---|---|
| Ni$_y$—Pd$_x$H$_z$ | 8 | Ni(acac)$_2$ | 8 | 10 | 160° C. 4 h |
| Co$_y$—Pd$_x$H$_z$ | 8 | Co(acac)$_2$ | 8 | 10 | 160° C. 4 h |
| Cr$_y$—Pd$_x$H$_z$ | 8 | Cr(acac)$_3$ | 11.1 | 10 | 160° C. 4 h |
| Mn$_y$—Pd$_x$H$_z$ | 8 | Mn(acac)$_2$ | 8.0 | 10 | 160° C. 4 h |
| V$_y$—Pd$_x$H$_z$ | 8 | V(acac)$_3$ | 10.9 | 10 | 160° C. 4 h |
| Pt$_y$—Pd$_x$H$_z$ | 8 | Pt(acac)$_2$ | 12.0 | 10 | 160° C. 4 h |
| No hydride | 8 | Fe(acac)$_3$ | 11.1 | 10 | 160° C. 4 h |
| No hydride | 8 | Cu(acac)$_2$ | 8.2 | 10 | 160° C. 4 h |

Figure 2:
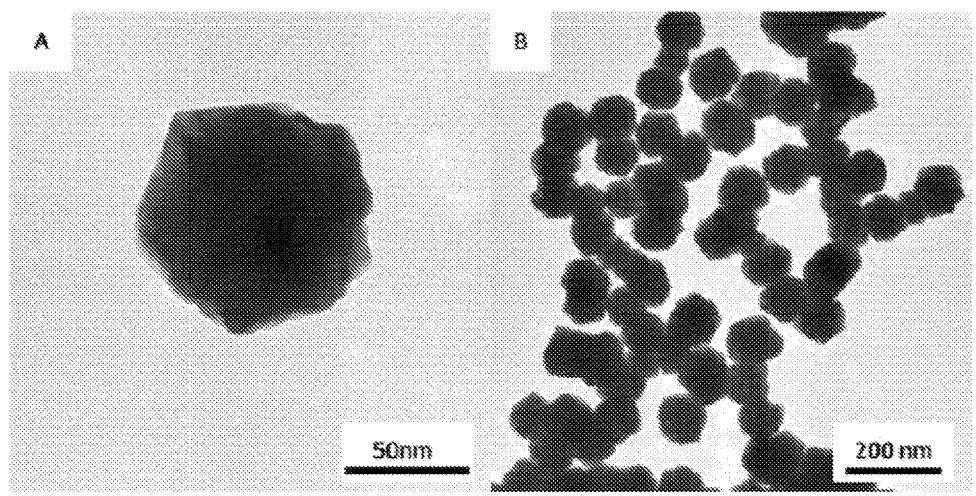
FIG. 2. (A) A transmission electron microscope (TEM) image of a palladium hydride nanoparticle. (B) A TEM zoom out image of (A).
Figure 3:
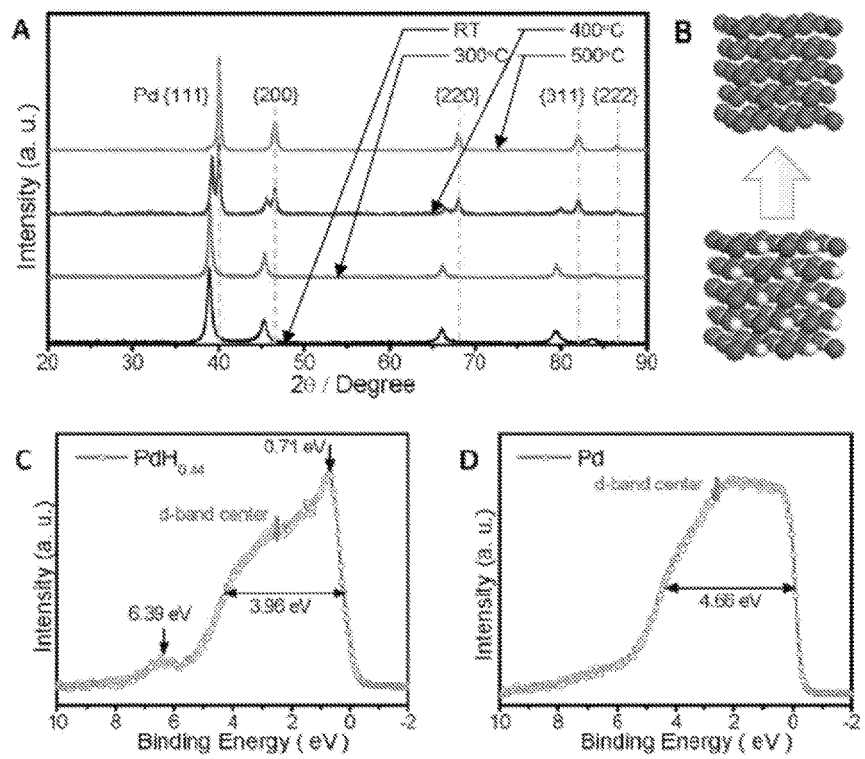
FIG. 3. (A) X-ray diffraction (XRD) results at room temperature (RT), after about 300° C., about 400° C., and about 500° C. annealing for about 2 h. (B) Schematic shows palladium hydride transformed to palladium, leading to lattice shrinking due to release of lattice hydrogen. (C,D) X-ray photoelectron spectroscopy (XPS) valence band structure of $PdH_{0.44}$ and Pd, with marking indicating the d-band center in both (C,D).

Results and Characterization:

A transmission electron microscope (TEM) image of a synthesized palladium hydride nanoparticle is shown in FIG. 2. The image indicates a nanoparticle with a diameter of 96±8 nm. FIG. 3A shows powder X-ray diffraction (XRD) results of the palladium hydride nanoparticle at room temperature (RT), which contains a diffraction pattern that fits face-centered cubic (fcc) packing of the palladium metal; however, a lattice parameter measured from XRD is larger than regular palladium. As listed in Table 2, the palladium hydride nanomaterial with fcc packing showed a lattice parameter of about 0.3996 nm, while palladium, which is also fcc packed, is reported to be about 0.3890 nm, indicating an about 2.7% lattice size increase in the hydride form. After energy dispersive spectrum (EDS) testing, just palladium metal was detected, and, as palladium was the sole metal-containing precursor employed during synthesis, the possibility of lattice parameter increase due to formation of palladium alloy with another metal can be ignored. As long as EDS testing solely shows palladium element, the XRD pattern obtained in FIG. 3A can be matched with palladium hydride. In the palladium hydride system, a lattice parameter change is dependent on different hydrogen ratios. As measured in XRD, palladium hydride with a lattice parameter of about 0.3996 nm would indicate the H:Pd ratio to be about 0.44 in a composition lattice parameter plot.

TABLE 2

XRD and corresponding lattice parameter

| | {111} Peak Position In 2θ (°) | Corresponding lattice parameter (nm) |
|---|---|---|
| Before 500° C. Annealing | 39.01 | 0.3996 |
| After 500° C. Annealing | 40.06 | 0.3890 |

There can be an α phase and a β phase for the palladium hydride system, and there can be a miscibility gap between the α phase and the β phase under a certain critical temperature. Palladium hydride can have a minimum H:Pd ratio at the edge of the palladium hydrogen miscibility gap, where the β phase minimum (H:Pd) would decrease as crystal size decreases, from about 0.58 corresponding to a polycrystalline bulk particle to about 0.44 corresponding to nanoscale palladium hydride. So both composition lattice parameter plot and β phase minimum decrease in nanoscale indicate the H:Pd ratio to be about 0.44.

FIG. 3A also shows the XRD results of palladium hydride annealing at different temperatures, with a small change observed when annealed for about 2 h at about 300° C., and with the {111} diffraction peak shifted from about 39.01° to about 39.04° in N. The original {111} diffraction peak split into two {111} diffraction peaks after 2 h annealing at about 400° C., with one of the peaks corresponding to palladium, and another one corresponding to the β phase of palladium hydride but with less hydrogen content. Partial formation of palladium domain within palladium hydride nanomaterial would lead to the size of palladium hydride domain further decreasing, which would allow even lower β phase minimum hydrogen content. After about 500° C. and about 2 h annealing, substantially all palladium hydride is transformed to palladium. FIG. 3B illustrates the lattice shrinking due to release of hydrogen. A palladium hydride model is built based on data from inorganic crystal structure database (ICSD#638415). Though a lattice parameter is different from what was obtained due to a different hydrogen ratio leading to a different lattice parameter, the fcc packing of palladium is in agreement, and hydrogen is expected to occupy the octahedron sites within the palladium fcc packed crystal structure.

Like EDS, electron energy loss spectroscopy (EELS) did not detect hydrogen, and a spectrum was taken for the valence band structure for palladium hydride and palladium using X-ray photoelectron spectroscopy (XPS). As shown in FIGS. 3C and 3D, the valence band structure for these two materials have significant difference. For palladium hydride, there is a peak at about 0.71 eV close to Fermi level, and also a small peak at about 6.39 eV close to the end of the valence band structure. Also, the bandwidth for palladium hydride is about 3.96 eV, which is smaller than about 4.66 eV for palladium. With these features matching with reported values, it can be confirmed that the material is palladium hydride.

With the valence band spectrum data, d-band center can also be calculated. Table 3 shows d-band width and d-band center for both materials.

TABLE 3

XPS band structure for palladium hydride and palladium

| | PdH$_{0.44}$ | Pd |
|---|---|---|
| band width (eV) | 3.96 | 4.66 |
| d-band center (eV) | 2.51 | 2.59 |

Figure 4:
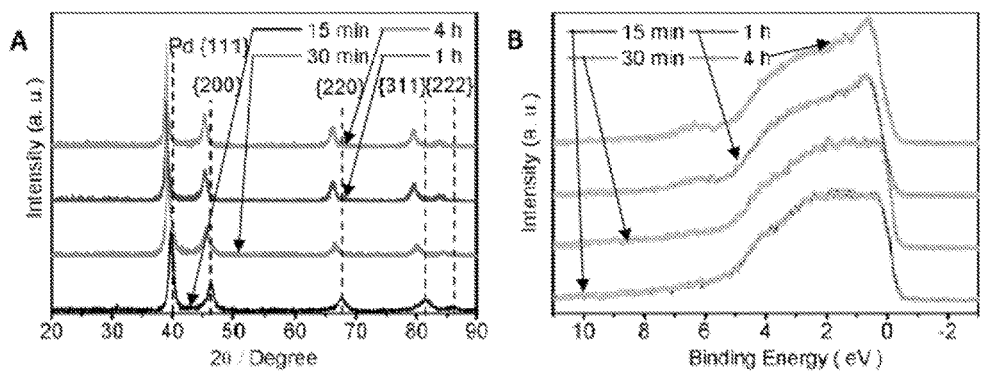
FIG. 4. (A) Time tracking XRD results for synthesis of $PdH_{0.44}$ with reaction time of about 15 min, about 30 min, about 1 h, and about 4 h. (B) Time tracking XPS results for synthesis of $PdH_{0.44}$ with reaction time of about 15 min, about 30 min, about 1 h, and about 4 h.

Time tracking, which is shown in FIG. 4, provided evidence for the formation mechanism of hydride. Synthesis solution turned color to black from orange when reaction lasted about 15 min, with XRD showing formation of palladium nanoparticles. Then after about 30 min, XRD showed formation of palladium hydride nanoparticles. After about 1 h, the XRD showed no significant difference compared to about 4 h. The change from palladium to palladium hydride also can be observed with XPS valence band spectrum. Both XRD and XPS provide evidence that, during the solution phase synthesis, palladium nanoparticles are first formed from a precursor and are transformed to palladium hydride nanoparticles with further particle growth.

TABLE 4

Lattice parameter change during synthesis

| Time Tracking | {111} Peak Position In 2θ (°) | Corresponding lattice Parameter (nm) |
|---|---|---|
| 15 min | 40.06 | 0.3890 |
| 30 min | 39.27 | 0.3970 |
| 60 min | 39.03 | 0.3993 |
| 240 min | 39.01 | 0.3996 |

Figure 5:
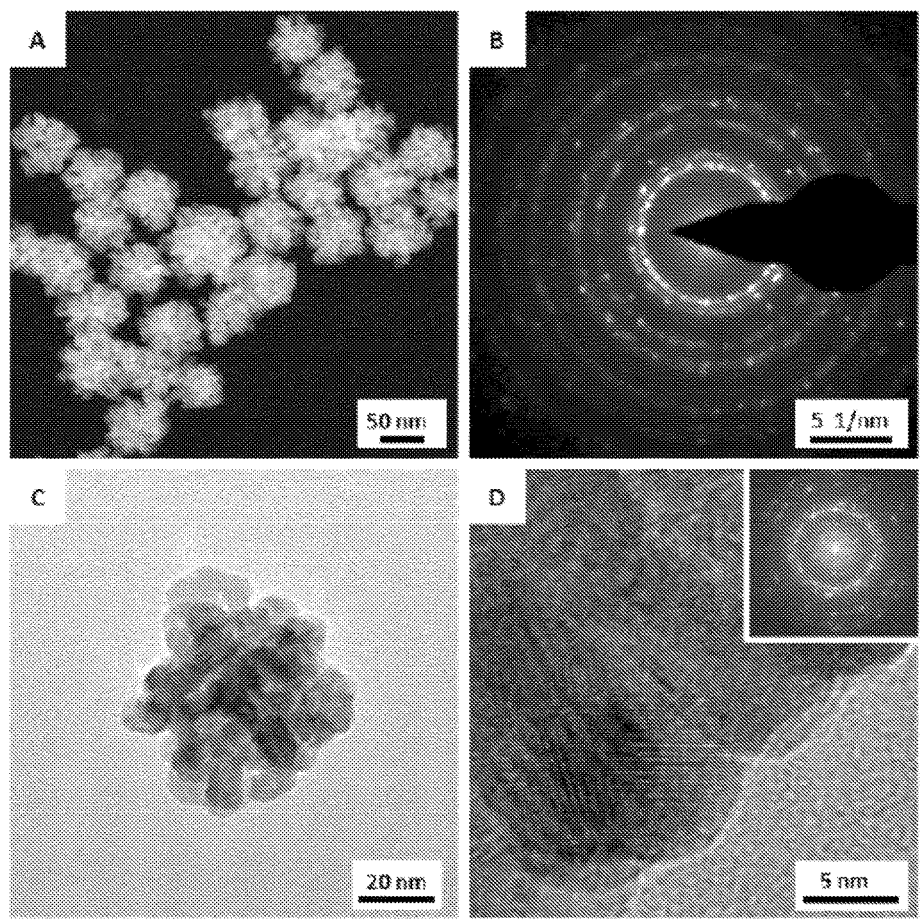
FIG. 5. (A) A scanning transmission electron microscope (STEM) image, (B) selected area electron diffraction (SAED) results, (C) a TEM image, and (D) a high resolution transmission electron microscope (HRTEM) image of palladium hydride nanobranch structures (insert: Fast Fourier Transform (FFT) of the HRTEM image in (D)).

In order to evaluate catalytic applications of palladium hydride, a screen of small molecules was undertaken to improve control over particle synthesis. It is found that short chain amine like n-butylamine and n-octylamine can be used as reagents to control the morphology and size of palladium hydride nanomaterial, with both of them leading to palladium hydride nanobranch structure. FIG. 5A shows a scanning transmission electron microscope (STEM) image of palladium hydride nanobranch structures. FIGS. 4C and 4D are TEM and high resolution transmission electron microscope (HRTEM) images. Both selected area electron diffraction (SAED) results in FIG. 5B and the Fast Fourier Transform (FFT) of the HRTEM image in FIG. 5D show that the lattice parameter is in agreement with the lattice parameter measured with XRD results, which is shown in FIG. 5A. Such data provide a connection between what is measured macroscopically in XRD and microscopically in TEM.

Figure 6:
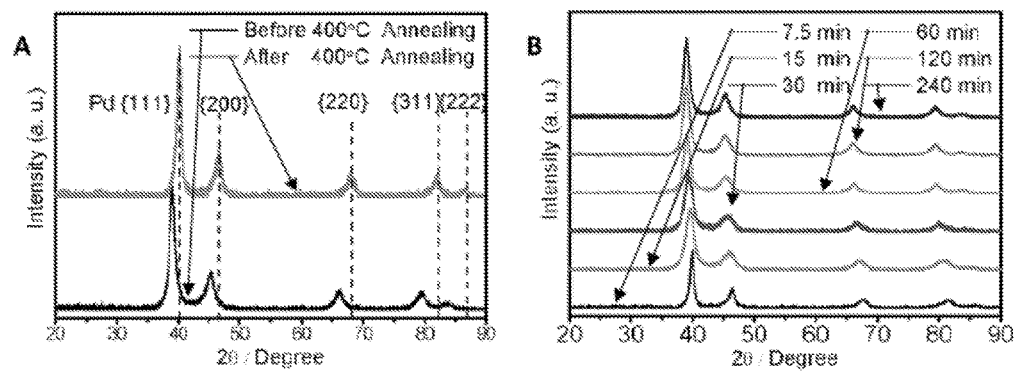
FIG. 6. (A) XRD results for $PdH_{0.44}$ nanobranch structure before and after about 400° C. annealing for about 2 h. (B) Time tracking XRD results for $PdH_{0.44}$ nanobranch structure during synthesis.

FIG. 6A shows XRD results for palladium hydride nanobranch structures before and after about 400° C. annealing for about 2 h, compared to the same experiment for palladium hydride nanoparticles, as shown in FIG. 3A. It is observed that palladium hydride nanobranch structure with smaller crystal domain is substantially fully transformed to palladium after about 400° C. annealing for about 2 h. Under the same conditions, palladium nanoparticle partially transformed to palladium, which indicates that palladium hydride with smaller crystal domain size can be less stable against elevated temperature.

FIG. 6B shows time tracking starting from about 7.5 min, which is also the time point when solution significantly changes color during synthesis. Compared to FIG. 4A, the time tracking in FIG. 6B indicates that, with the addition of n-octylamine, the synthesis reaction is faster than without the reagent.

Figure 7:
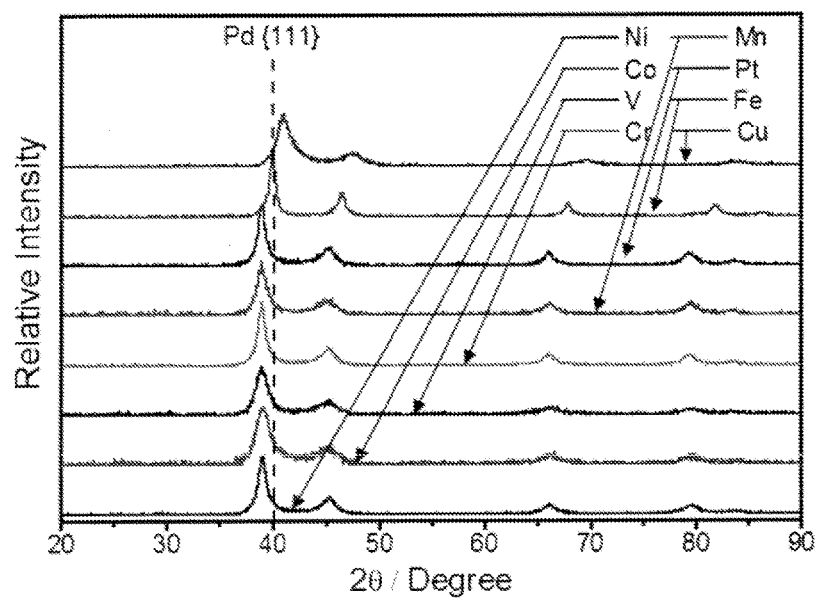
FIG. 7. XRD results for $M_y$-$Pd_xH_z$ (M=Ni, Co, Cr, Mn, V, and Pt) and PdCu and PdFe.

The synthesis can be extended to nanomaterials including a combination of palladium hydride and another transition metal. XRD results in FIG. 7 showed that, with the above synthetic method, PdNi, PdCo, PdCr, PdMn, PdPt, and PdV can form hydrides during the synthesis, while PdCu and PdFe (reducing effect of Fe is low) could not in some embodiments. The XRD peak shift to a lower angle for Pd alloy system is evidence for lattice expansion after hydrogen incorporation into a crystal structure.

Figure 8:
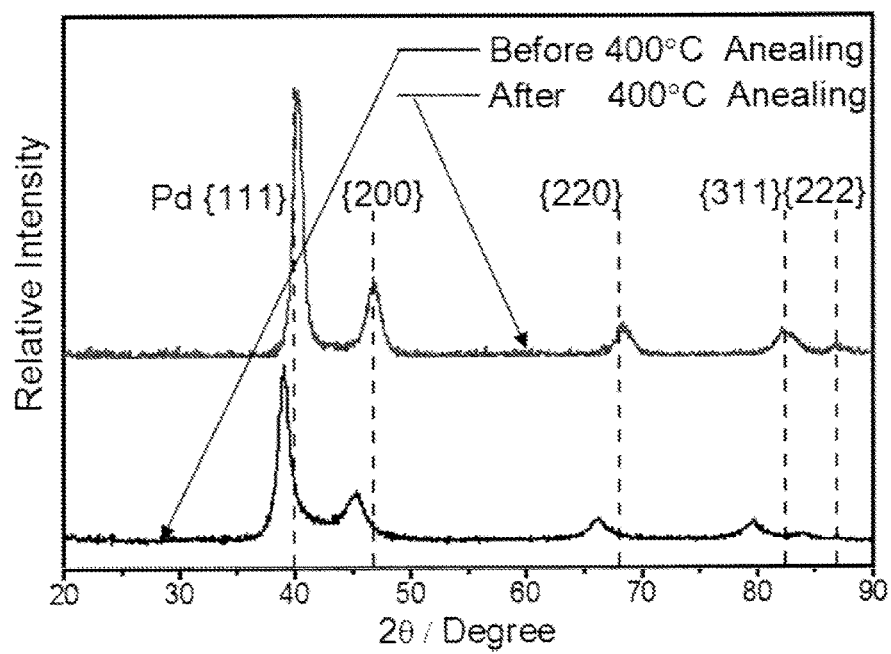
FIG. 8. XRD results for $Ni_y$—$Pd_xH_z$ before and after about 400° C. annealing for about 2 h.

Furthermore, it is observed that a crystal lattice shrinks after annealing in about 400° C. under argon (Ar) flow for about 2 h. FIG. 8 shows that the {111} peak for a $Ni_y$—$Pd_xH_z$ nanomaterial before annealing is about 39.09° and correspond to a lattice parameter of about 3.988 Å due to the formation of a hydride, and, after annealing, the lattice parameter is about 3.875 Å, which is smaller than palladium alone due to the formation of the PdNi alloy. Such lattice parameter comparison shown in Table 5 is another evidence for the formation of the PdNiH ternary system (see also Table 6).

TABLE 5

Lattice parameter change for $Ni_y$—$Pd_xH_z$ before and after annealing

| 4 h | {111} Peak Position (°) | lattice Parameter (nm) |
|---|---|---|
| Before Annealing | 39.09 | 0.3988 |
| After Annealing | 40.31 | 0.3875 |

TABLE 6

Lattice parameter for Pd, Ni, $PdH_{0.7}$, and $Ni_y$—$Pd_xH_z$

| | Lattice Parameter (Å) | Peak Position (°) |
|---|---|---|
| Pd | 3.890 | 40.10 |
| Ni | 3.524 | 44.50 |
| $PdH_{0.7}$ | 4.040 | 38.57 |
| $Ni_{0.1}$—$Pd_{0.9}H_{0.44}$ | 3.987 | 39.12 |

Figure 9:
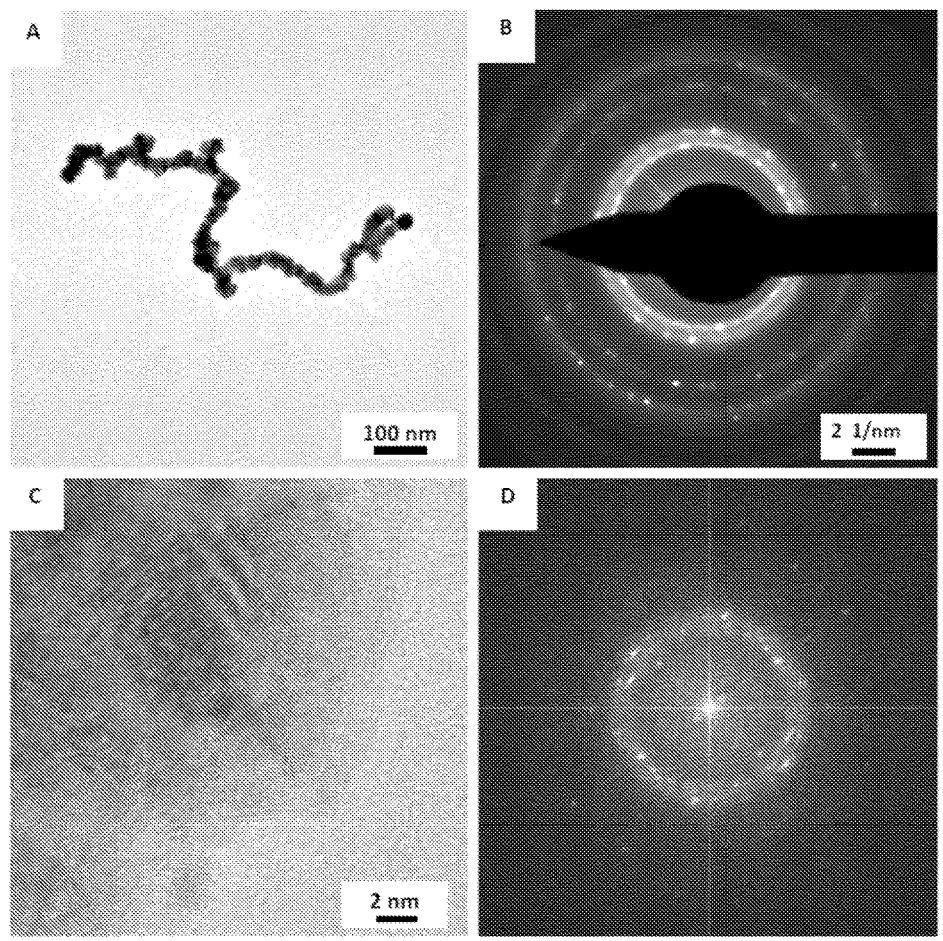
FIG. 9. (A) A TEM image of $Ni_y$—$Pd_xH_z$. (B) SAED results for $Ni_y$—$Pd_xH_z$. (C) A HRTEM image of $Ni_y$—$Pd_xH_z$. (D) FFT of the HRTEM image in (C).

As shown in FIG. 9, TEM results showed the morphology of the as-synthesized $Ni_y$—$Pd_xH_z$, and HRTEM results showed the crystal lattice, while both SAED and FFT of the HRTEM results showed the lattice parameter to be about 3.98 Å, both of them in agreement with the XRD results. These results provide additional support for the lattice measurement and at the same time confirmed that the macroscopic XRD results are based on the nanomaterial observed in TEM.

As used herein, the singular terms "a," "an," and "the" include plural referents unless the context clearly dictates otherwise. Thus, for example, reference to an object can include multiple objects unless the context clearly dictates otherwise.

As used herein, the term "set" refers to a collection of one or more objects. Thus, for example, a set of objects can include a single object or multiple objects.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can encompass a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

As used herein, the term "size" refers to a characteristic dimension of an object. Thus, for example, a size of an object that is spherical can refer to a diameter of the object. In the case of an object that is non-spherical, a size of the non-spherical object can refer to a diameter of a corresponding spherical object, where the corresponding spherical object exhibits or has a particular set of derivable or measurable properties that are substantially the same as those of the non-spherical object. When referring to a set of objects as having a particular size, it is contemplated that the objects can have a distribution of sizes around the particular size.

Thus, as used herein, a size of a set of objects can refer to a typical size of a distribution of sizes, such as an average size, a median size, or a peak size.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

While the disclosure has been described with reference to the specific embodiments thereof, it should be understood by those skilled in the art that various changes may be made and equivalents may be substituted without departing from the true spirit and scope of the disclosure as defined by the appended claims. In addition, many modifications may be made to adapt a particular situation, material, composition of matter, method, operation or operations, to the objective, spirit and scope of the disclosure. All such modifications are intended to be within the scope of the claims appended hereto. In particular, while certain methods may have been described with reference to particular operations performed in a particular order, it will be understood that these operations may be combined, sub-divided, or re-ordered to form an equivalent method without departing from the teachings of the disclosure. Accordingly, unless specifically indicated herein, the order and grouping of the operations is not a limitation of the disclosure.

What is claimed is:

1. A palladium hydride nanomaterial, comprising:
nanostructures having a chemical composition represented by the formula: $M_y\text{-}Pd_xH_z$, wherein
M is at least one metal different from palladium;
x has a non-zero value in the range of 0 to 5;
y has a value in the range of 0 to 5; and
z has a non-zero value in the range of 0 to 5,
wherein a sum of x and y is equal to 1, and a ratio of z to the sum of x and y is less than or equal to 0.5,
wherein the nanostructures have sizes in the range of 1 nm to 500 nm.

2. The palladium hydride nanomaterial of claim 1, wherein y has a non-zero value, M is at least one transition metal different from palladium, and the nanostructures include an intermetallic alloy of M and palladium.

3. The palladium hydride nanomaterial of claim 1, wherein M is selected from nickel, cobalt, chromium, manganese, vanadium, and platinum.

4. The palladium hydride nanomaterial of claim 1, wherein x is in the range of 0.2 to 1.

5. The palladium hydride nanomaterial of claim 1, wherein y is in the range of 0 to 0.8.

6. A palladium hydride nanomaterial, comprising:
nanostructures having a chemical composition represented by the formula: $M_y\text{-}Pd_xH_z$, wherein
M is at least one metal different from palladium;
x has a non-zero value in the range of 0 to 5;
y has a non-zero value in the range of 0 to 5; and
z has a non-zero value in the range of 0 to 5,
wherein the nanostructures have sizes in the range of 1 nm to 500 nm.

7. The palladium hydride nanomaterial of claim 6, wherein the nanostructures are crystalline.

8. The palladium hydride nanomaterial of claim 6, having a specific surface area of at least 1 $m^2/g$.

9. The palladium hydride nanomaterial of claim 6, wherein M is selected from nickel, cobalt, chromium, manganese, vanadium, and platinum.

10. The palladium hydride nanomaterial of claim 6, wherein x is in the range of 0.2 to 1, y is in the range of 0 to 0.8, and z is in the range of 0.1 to 0.9.

11. A solution phase synthesis method to form a palladium alloy hydride nanomaterial, comprising:
reacting a palladium-containing precursor and at least one other metal-containing precursor in a liquid medium to form nanostructures of a palladium alloy hydride, wherein the metal-containing precursor includes a metal different from palladium.

12. The method of claim 11, wherein the metal is a transition metal different from palladium.

13. The method of claim 11, wherein the metal is selected from nickel, cobalt, chromium, manganese, vanadium, and platinum.

14. The method of claim 11, wherein the palladium-containing precursor is a coordination complex of palladium with an organic anion.

15. The method of claim 11, wherein the metal-containing precursor is a coordination complex of the metal with an organic anion.

16. The method of claim 11, wherein a weight ratio of the metal-containing precursor and the palladium-containing precursor is in the range of 0.1 to 10.

17. The method of claim 11, wherein the liquid medium includes at least one organic solvent.

18. The method of claim 11, wherein reacting is under conditions of a temperature in the range of 50° C. to 250° C., and a time duration in the range of 0.5 h to 15 h.

19. The method of claim 11, wherein reacting is in the presence of an amine.

20. The method of claim 11, wherein the nanostructures have sizes in the range of 1 nm to 500 nm.

* * * * *